United States Patent
Autio et al.

(10) Patent No.: US 6,714,990 B1
(45) Date of Patent: Mar. 30, 2004

(54) COMMUNICATION SYSTEM AND DATA ADAPTER

(75) Inventors: Juha Autio, Tampere (FI); Veli-Pekka Vatula, Nokia (FI); Peter Ollikainen, Lempäälä (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/523,241

(22) Filed: Mar. 10, 2000

(30) Foreign Application Priority Data

Mar. 12, 1999 (FI) ................................................ 990546

(51) Int. Cl.⁷ .............................................. G06F 15/16
(52) U.S. Cl. ........................ 709/250; 709/251; 709/252; 709/253; 709/328; 710/72; 719/328
(58) Field of Search ................................ 709/250, 251, 709/252, 253, 328; 710/72; 719/238

(56) References Cited

U.S. PATENT DOCUMENTS

| | | | |
|---|---|---|---|
| 5,680,551 A | 10/1997 | Martino, II | 395/200.15 |
| 5,721,729 A * | 2/1998 | Klingman | 370/251 |
| 5,825,759 A * | 10/1998 | Liu | 370/331 |
| 5,884,103 A * | 3/1999 | Terho et al. | 710/72 |
| 5,896,512 A * | 4/1999 | Einbinder et al. | 709/250 |
| 5,983,274 A * | 11/1999 | Hyder et al. | 709/230 |
| 6,044,408 A * | 3/2000 | Engstrom et al. | 709/328 |
| 6,070,199 A * | 5/2000 | Axtman et al. | 710/1 |
| 6,111,894 A * | 8/2000 | Bender et al. | 370/469 |
| 6,119,180 A * | 9/2000 | Terho et al. | 710/72 |
| 6,137,802 A * | 10/2000 | Jones et al. | 370/401 |
| 6,204,847 B1 * | 3/2001 | Wright | 345/804 |
| 6,246,211 B1 * | 6/2001 | Dalton et al. | 320/114 |
| 6,272,553 B2 * | 8/2001 | Way et al. | 709/250 |
| 6,330,244 B1 * | 12/2001 | Swartz et al. | 370/401 |
| 6,351,771 B1 * | 2/2002 | Craddock et al. | 709/227 |
| 6,594,666 B1 * | 7/2003 | Biswas et al. | 707/100 |
| 6,642,941 B1 * | 11/2003 | Kurata et al. | 345/733 |
| 6,643,690 B2 * | 11/2003 | Duursma et al. | 709/217 |
| 6,643,721 B1 * | 11/2003 | Sun | 710/62 |
| 6,651,104 B1 * | 11/2003 | Moon | 709/238 |

FOREIGN PATENT DOCUMENTS

| | | |
|---|---|---|
| EP | 919932 | 6/1999 |
| WO | WO 98/21862 | 5/1998 |

OTHER PUBLICATIONS

David et al., "A Packet Radio API", (Information, Telecommunications, and Automation Division Telecommunications and Distributed Processing Program Menlo Park, California). IEEE 0–7803–1997, pp. 1261–1265.*

(List continued on next page.)

Primary Examiner—Bunjob Jaroenchonwanit
Assistant Examiner—Thanh T. Nguyen
(74) Attorney, Agent, or Firm—Perman & Green, LLP

(57) ABSTRACT

The invention relates to a communicating system comprising a data terminal, a wireless communication device, and data transmission means for setting up a local data transmission connection between the data terminal and the wireless communication device. The data transmission means comprise a data transmission means of the data terminal and a data transmission means of the wireless communication device. The data terminal comprises means for running application software, an application software connection, means for controlling the data transmission means of the data terminal, and a first connection interface for data transmission between the application and the application programming interface. The data transmission system comprises also a data adapter, a second connection interface for data transmission between the application programming interface and the data adapter, and one or several media interfaces for data transmission between the data adapter and the data transmission means of the data terminal.

14 Claims, 6 Drawing Sheets

OTHER PUBLICATIONS

Mads et al., "Support CORBA Applications in a Mobile Environment", (International Conference on Mobile Computing and Networking). ACM Press, 1999 1–58113. pp. 36–47.*

Jin et al., "Client–Server Computing in Mobile Environments" ACM Computing Surveys. 1999–036–0300. pp. 117–157.*

Marko et al., "Windows NT Software Design and Implementation for a Wireless LAN Base Station", International Workshop on Wireless Mobile Multimedia. ACM Press. 1999. 1–58113–129–1. pp. 2–9.*

Chalermek et al., "Directed Diffusion for Wireless Sensor Networking" IEEE/ACM Transactions on Networking, 2003 1063–6692, pp. 2–16.*

* cited by examiner

COMMUNICATION SYSTEM AND DATA ADAPTER

BACKGROUND OF THE INVENTION

1. Field of the Invention

The present invention relates to a communication system comprising a data terminal, a wireless communication device, and data transmission means for setting up a local data transmission connection between the data terminal and the wireless communication device, wherein the data transmission means comprise the data transmission means of the data terminal and the data transmission means of the wireless communication device, and the data terminal comprises means for running application software, an application programming interface, means for controlling the data transmission means of the data terminal, and a first connection interface for data transmission between the application and the application programming interface. Furthermore, the invention relates to a data terminal to be used in a communication system comprising also a wireless communication device, and data transmission means for setting up a local data transmission connection between the data terminal and the wireless communication device, wherein the data transmission means comprise the data transmission means of the data terminal and the data transmission means of the wireless communication device, and the data terminal comprises means for running application software, an application programming interface, means for controlling the data transmission means of the data terminal, and a first connection interface for data transmission between an application and the application programming interface. Moreover, the invention relates to a method for data transmission between a data terminal and a wireless communication device, in which method a local data transmission connection is set up between the data terminal and the wireless communication device, the data terminal is equipped with an application programming interface and the data transmission means for the data terminal, and an application software is run in the data terminal, wherein data is transmitted between the application and the application programming interface via the first connection interface.

2. Brief Description of Related Developments

In a way known as such, a modem is used for coupling a data terminal and telecommunication network to enable data transmission between the data terminal and the telecommunication network. The model performs e.g. the adapting of signals transmitted from the data terminal to the telecommunication network into a suitable format and, correspondingly, the adapting of signals received from the telecommunication network into a format intelligible to the data terminal.

Two data terminals can communicate with each other via a telecommunication network. In this communication, a known data transmission protocol is generally used to secure the operation and the reliability of the connection. One example of a data transmission protocol is error correction, for which the transmitting data terminal supplements the data to be transmitted with check-up characters according to a standard applied. By comparing the received data with the check-up characters, the receiving data terminal can deduce whether errors are contained in the data transmission.

With the increase in wireless communication, also wireless communication devices are introduced as part of data transmission systems, wherein such a wireless communication device is arranged in a data transmission connection with a data terminal. Thus, the wireless communication device takes care of the adapting between the data terminal and the wireless communication network. Such a wireless communication device used can be e.g. a mobile phone according to the GSM mobile communication system, equipped with means for coupling to the data terminal.

In the first generation of such wireless communication devices, the data terminal was coupled typically with a wire by means of a serial bus, wherein a connecting cable made for this purpose was coupled between the wireless communication device and the data terminal. Particularly in wireless communication devices, the structure of the connection can vary between different manufacturers and even between different models by the same manufacturer; consequently, a connecting cable of a certain kind, suitable for the model in question, had to be acquired for each wireless communication device. For eliminating this drawback, also other communication systems have been developed between the wireless communication device and the data terminal. As an example, a wireless connection based on infrared data transmission should be mentioned in this context. For applying this connection, the IrDA standard (Infra-red Data Association) has been drawn up, and this IrDA standard is observed by several manufacturers in their own wireless communication devices in which such an option for infrared connection is implemented. A wireless communication system based on radio communication is also under development, particularly to meet the needs of data transmission in short distances, such as for arranging a data transmission connection between a wireless communication device and a data terminal. Thus, the wireless communication device and the data terminal each have a separate radio transmitter/receiver, whereby the wireless communication device and the data terminal can communicate with each other. Also other techniques are known for arranging a wireless data transmission connection between two devices, e.g. an inductive connection.

Also, wireless communication devices are known which are formed as a connection card to be connected to the data terminal. One such a connection card to be mentioned is the so-called PCMCIA connection card (Personal Computer Memory Card Association). Such a card-format wireless communication device can be used particularly in the case of portable computers to implement a wireless data transmission connection via a mobile communication network to another data terminal. For connecting the connection card, the data terminal is equipped with a card connection, through which e.g. the operating voltages and the required signals are transmitted to the connection card.

In addition to the fact that the wireless communication device and the data terminal use data transmission means according to the same data transmission method, information must be converted to a format compatible with this data transmission method in the wireless communication device and in the data terminal. The data terminal, such as a so-called personal computer PC, is provided with a device driver for the adapting between the hardware and the software in the data terminal. The actual information to be transmitted is generated in an application software, e.g. in a terminal emulator. This application program transmits the information to be transmitted to an application programming interface API, where the information is converted to a format complying with the data transmission method to be used, e.g. into a format to be transmitted via a serial port to a serial bus, or, when infrared connection is used, into a format compatible with this connection method. From the application programming interface, the information is transmitted to the corresponding device driver which controls the actual data transmission means. One such arrangement of prior art is shown in a reduced block chart in the appended FIG. 1. In practical applications, these blocks shown in FIG. 1 are implemented at least primarily in the software, which is known as such.

In a corresponding manner, the means required for using the local data transmission connection are implemented in the wireless communication device, wherein the wireless communication device can transmit information conveyed via the local data transmission connection to a mobile communication network and, correspondingly, information conveyed via the mobile communication network to the local data transmission connection.

If the wireless communication device is provided with such local data transmission means, it is usually also provided with the required software integrated already at the manufacturing stage.

The data terminal can have several different local data transmission methods available, wherein the data terminal is equipped with the respective device drivers or the like for controlling the data transmission means. Moreover, the operations required for different types of data transmission methods must be implemented in said application programming interface API, preferably in the mobile phones application programming interface MPAPI. For example, if a wired serial-format data transmission connection, an infrared data transmission connection and a radio data transmission connection are available in the data terminal, this mobile phones application programming interface must have means for transmitting information between the data transmission means and the application for all these different methods of data transmission. A drawback in such an arrangement is that e.g. upon adding one new method of data transmission or changing the properties of a data transmission method already implemented, the modifications must be directed to this whole MPAPI interface. Thus, the work involved in these changes increases substantially, and moreover, the maintenance of such an arrangement requires a lot of resources. Also, the possibility of errors in such a way of implementation is great.

The way of coupling the wireless communication device to the data terminal affects the protocol used in the data transmission connection. For example, in a wired, serial-format data transmission connection, the data transmission protocol can be an asynchronous or synchronous serial-format data transmission protocol. In a corresponding manner, in an infrared connection, the transmission of various messages is typically used.

In such an MPAPI interface according to prior art, this MPAPI interface communicates with the corresponding device driver which transmits the messages further to the wireless communication device. Thus, the MPAPI interface takes care of dividing the messages to be transmitted into suitable elements (packets), buffering, and other corresponding basic operations. Typically, these operations are not similar in different data transmission methods, wherein the structure of the MPAPI interface can become very complex, if many different data transmission methods are implemented in this MPAPI interface.

SUMMARY OF THE INVENTION

It is a purpose of the present invention to present a data transmission system in which the above-mentioned drawbacks are eliminated to a great extent. This data transmission system is based on the idea that a data adapter is provided between the MPAPI interface and the device drivers to take care of the required conversions between the MPAPI interface and the device driver. The data transmission system according to the present invention is characterized in that the data transmission system comprises also a data adapter, a second connection interface for data transmission between the application programming interface and the data adapter, and one or several media interfaces for data transmission between the data adapter and the data transmission means of the data terminal. The data terminal according to the present invention is characterized in that the data terminal comprises also a data adapter, a second connection interface for data transmission between the application programming interface and the data adapter, and one or several media interfaces for data transmission between the data adapter and the data transmission means of the data terminal. Furthermore, the method according to the present invention is characterized in that in the method, also a data adapter is provided, wherein information is transmitted between the application programming interface and the data adapte, and information is transmitted between the data adapter and the data transmission means of the data terminal via one or several media interfaces.

Using the present invention, significant advantages are achieved with respect to solutions of prior art. In the data transmission system of the invention, the MPAPI interface can be maintained substantially the same also in a situation when a data terminal is supplemented with new local data transmission means. The required modifications are thus implemented in the data adapter according to the invention, wherein the maintenance of the system is considerably simpler and the possibilities of errors are reduced when compared with the arrangement of prior art. Moreover, the modification of the data adapter requires no information on the internal method of implementation of the MPAPI interface but only on the interface between the data adapter and the MPAPI interface.

BRIEF DESCRIPTION OF THE DRAWINGS

In the following, the present invention will be described in more detail with reference to the appended drawings, in which.

DETAILED DESCRIPTION OF THE PREFERRED EMBODIMENT(S)

In the following, the invention will be described in more detail by using as an example e.g. a data transmission system 1 shown in FIG. 5, in which wireless communication device 2 used is a mobile communication device according to the GSM mobile communication system and data terminal 3 is a computer PC. It is obvious that the invention can also be applied in connection with other wireless communication devices and data terminals as those presented in this description.

Figure 5:
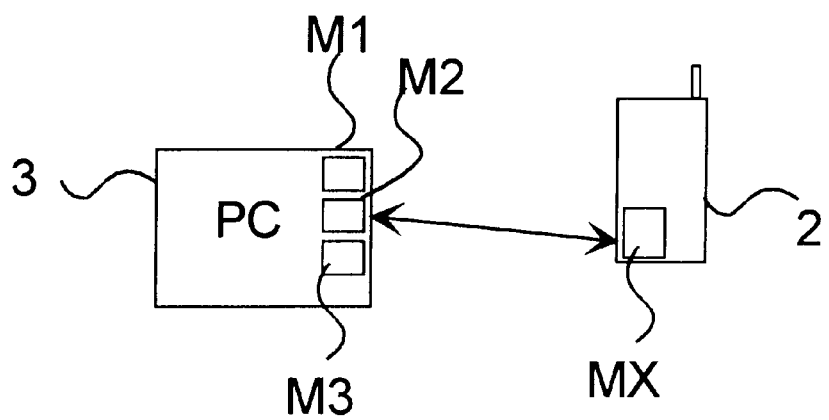
FIG. 5 shows a data transmission system according to an advantageous embodiment of the invention.

In the embodiment of FIG. 5, a local data transmission connection between the data terminal 3 and the wireless communication device 2 is implemented as a cabled serial-format data transmission connection. Thus, a connecting cable 4 is connected between the data terminal 3 and the wireless communication device 2 for the transmission of signals. In the data terminal 3, the connecting cable 4 is connected to a serial port COM1, COM2. Usually, PC computers have two such serial ports, but there can be several or only one serial port. The wireless communication device 2 has a data port 5 to which the connecting cable 4 can be connected. In a way known as such, this data port has the required pins for coupling the electric signals to be transmitted in the wires (not shown) of the connecting cable 4 to the rest of the electronics in the wireless communication device 2.

In the data terminal, the serial port is usually coupled to a serial traffic circuit, such as a UART circuit (Universal Asynchronous Receiver Transmitter) or USRT (Universal Synchronous Receiver Transmitter), for performing e.g. the conversions of the signal levels between the data terminal 3 and the serial bus (connecting cable). The voltage levels used in the data terminal are typically ca. 0 V (logical 0 state) and ca. 5 V, ca. 3.3 V or ca. 3 V (logical 1 state). In a corresponding manner, the voltage levels to be applied in the serial bus are in the order of 5 to 12 V (logical 0 state) and −5 to −12 V (logical 1 state). Furthermore, the serial traffic circuit performs the conversion of serial-format data into parallel format at the receiving stage and the conversion of parallel-format data into serial format at the transmission stage. Typically, serial traffic circuits also have data buffers for intermediate storage for transmission and reception. The implementation of such serial buses and the components required in them is prior art known to anyone skilled in the art, whereby it will not be necessary to discuss them in more detail in this context.

Figure 4:
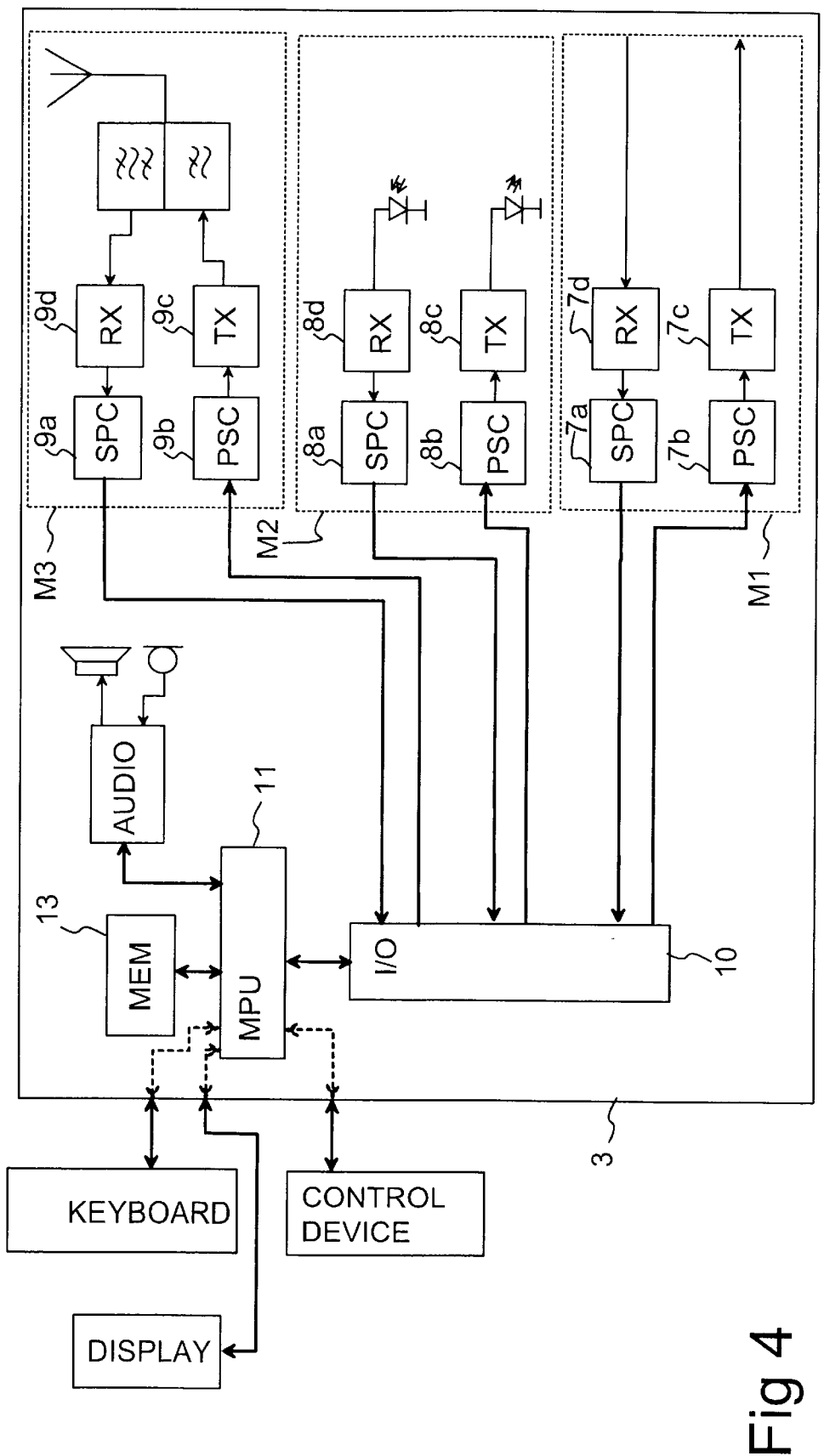
FIG. 4 shows a data terminal in which the data adapter according to the invention can be advantageously applied.

Furthermore, FIG. 4 shows some local data transmission means M1, M2, M3 in the data terminal 3. In this advantageous embodiment, these data transmission means M1, M2, M3 comprise means 7a–7d for cabled data transmission, means 8a–8d for infrared data transmission, and means 9a–9d for radio communication. These local data transmission means M1, M2, M3 comprise preferably a serial-to-parallel converter 7a, 8a, 9a, a parallel-to-serial converter 7b, 8b, 9b, a transmitter 7c, 8c, 9c, and a receiver 7d, 8d, 9d. In addition, the local data transmission means comprise, if necessary, an interface block 10 for performing the operations required for communication between the processor 11 and the local data transmission means M1, M2, M3 in the data terminal. This interface block 10 can be shared by all the different data transmission means 7a–7d; 8a–8d; 9a–9d, or each may be provided with its own interface block.

In communication between the interface block 10 and the processor 11, it is advantageous to apply the so-called interrupt principle, wherein via an interrupt line or the like arranged for this purpose, the interface block transmits information that any of the data transmission means has received information. Thus, a corresponding interrupt service program is run in the processor 11. This interrupt service program contains a set of program commands, whereby the processor 11 reads the received information or, if it is desired to keep the interrupt service program as short and fast as possible, the program 11 sets a flag as a sign for receiving information, wherein the processor reads the received information later after running the interrupt service program.

Also, data transmission to the local data transmission bus can be implemented with the interrupt principle e.g. in a way that the processor 11 writes for example one byte of the information to be transmitted to the interface block 10. After the byte has been transmitted to the data transmission bus, the interface block 10 sets a transmission interruption which is transmitted to the processor 11. After this, the processor 11 can write the next byte to be transmitted.

The following is a short description on the operation of the device driver in a data terminal 3. The device driver is normally integrated in the software of the processor 11. The data terminal 3 comprises preferably a device driver for each device connected to or integrated in the terminal device, such as a display, a keypad, a control device, a serial connection port, a parallel connection port, as well as possible local data transmission means. Such a device driver executes e.g. the controlling of the respective physical block, setting of the functional parameters, processing of possible interruptions, as well as reading/writing of data.

Figure 1:
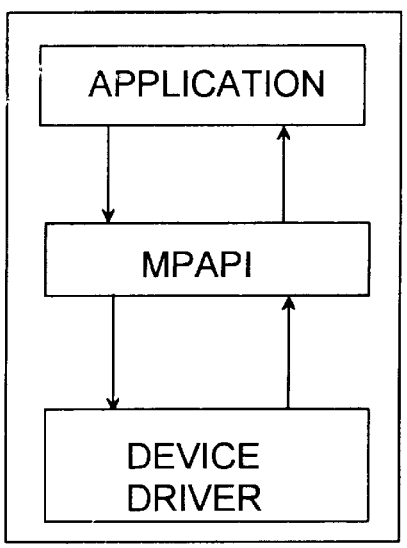
FIG. 1 shows the implementation of a local data transmission system according to prior art in a data terminal, in a reduced block chart.
Figure 2:
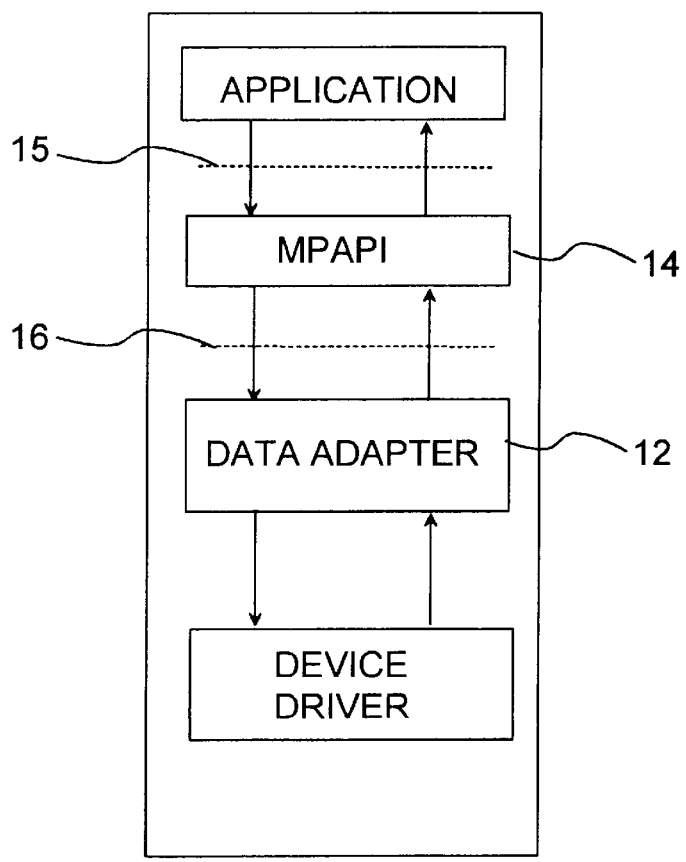
FIG. 2 shows the implementation of a local data transmission system according to the invention for the part of a data terminal in a reduced block chart.
Figure 3:
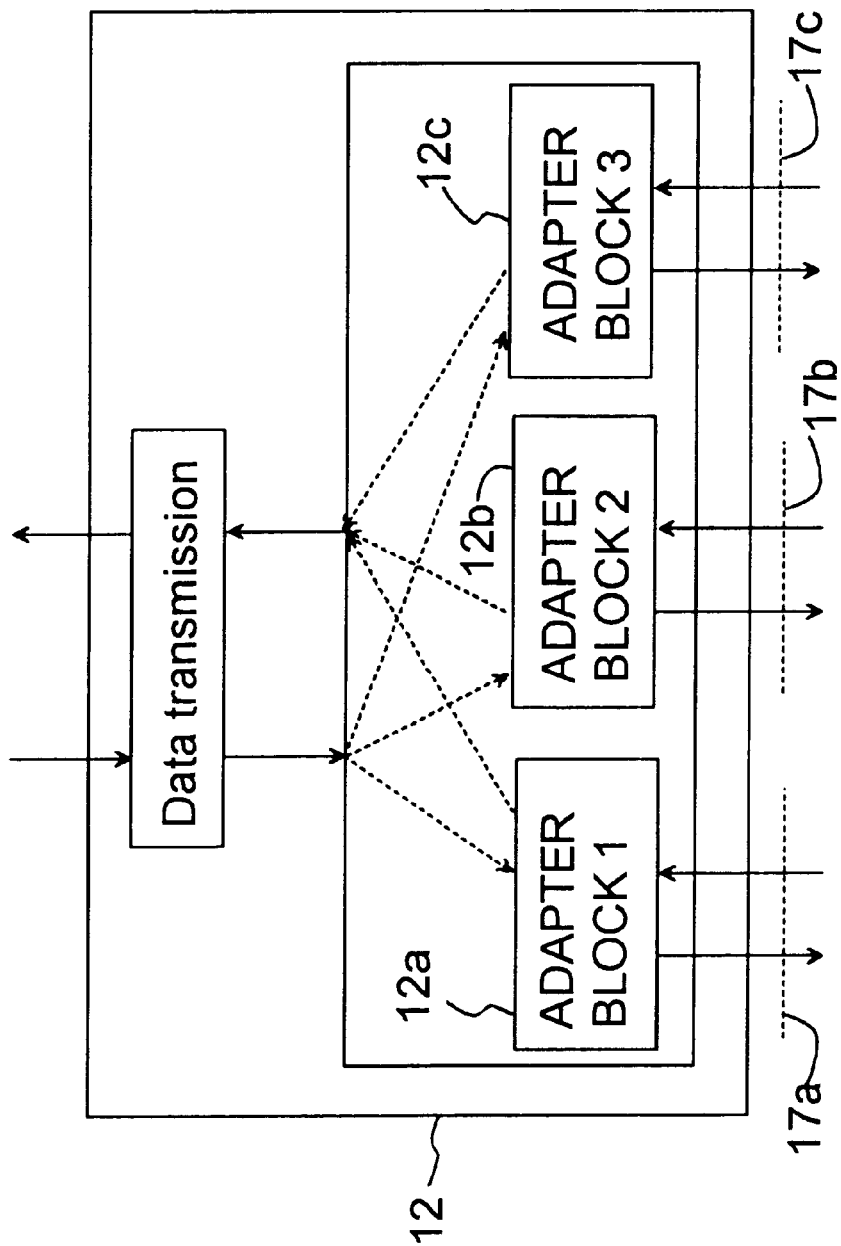
FIG. 3 shows the internal structure of a data adapter according to an advantageous embodiment of the invention in a reduced manner.

FIG. 2 shows the implementation of a communication system according to an advantageous embodiment of the invention with respect to the data terminal 3 in a reduced block chart. FIG. 3, in turn, shows a data adapter 12 according to an advantageous embodiment of the invention in a reduced block chart. Preferably, an operating system is run in the data terminal 3 to take care of e.g. starting different applications, allocating operating time to the applications, controlling the device drivers, etc. In a situation in which the user of the data terminal 3 wishes to set up a data transmission connection to another data terminal, e.g. a data transmission program or the like is started in the data terminal 3. Such a data transmission program is delivered e.g. in connection with the wireless communication device 2, wherein the data transmission program contains the means required for controlling the wireless communication device 2 as well as means for using the local data transmission means M1, M2, M3. This data transmission program can also implement functions of a known communication protocol, e.g. AT commands which are known from conventional modems used in connection with a landline telecommunication network. At the stage of installing a data transmission program, the user has been able to select what kind of data transmission means M1, M2, M3 are used in this data transmission. Thus, upon starting, the data transmission program preferably selects this data transmission mode and executes the setting of the corresponding local data transmission means, e.g. infrared data transmission means M2, in the desired functional state. The data transmission rate, number of bits, parity, etc. are preferably selected upon setting of the functional state. At least some of these initial settings can be normally changed if necessary. These settings are stored at the installation stage either in connection with the application or in connection with the operating system. The data terminal 3 and the wireless communication device 2 can also communicate with each other and select the suitable initial settings for the data transmission. In connection with these initializing operations, one or several memory spaces in the memory means 13 of the data terminal are allocated for the data transmission and possibly also for the device drivers. Some of the initializing operations of said local data transmission means M1, M2, M3 may have been made already upon starting the operating system.

In addition to the application program, the operating system starts also an MPAPI interface 14. This MPAPI interface comprises e.g. a first connection interface 15 for transmitting information between the application program and the MPAPI interface. For this first connection interface 15, a memory space is preferably determined in the memory means 13 of the data terminal. The transmission of information can be executed e.g. by means of signals of the operating system, as will be presented below in this description.

Furthermore, a data adapter 12 according to an advantageous embodiment of the invention is started. The data adapter 12 communicates with the MPAPI interface by using a second connection interface 16. The data adapter 12 is also provided with media interfaces 17a, 17b, 17c (FIG. 3) for communicating with different types of device drivers.

The data adapter 12 finds out preferably from the memory means 13 of the data terminal, what type of a data transmission method is installed between the data terminal 3 and the wireless communication device 2. On the basis of this, the data adapter 12 selects an adapter block 12a, 12b, 12c formed for this data transmission method. The purpose of these data adapter blocks 12a–12c is e.g. to execute the required protocol conversions between the MPAPI interface and the device to be used in the data transmission. The data adapter 12 can find out the method to be used in the local data transmission also by making a request with each of the local data transmission means M1, M2, M3 installed in the data terminal 3. Thus, the wireless communication device 2 replies with the data transmission method formed in the wireless communication device 2, and on the basis of this, the data adapter 12 selects this data transmission method and the respective adapter block 12a–12c to be used in the local data transmission connection.

The practical implementation of the adapter block 12a–12c depends e.g. on the type of the data transmission method in which the adapter block is formed. For example, a first adapter block 12a formed for cabled serial traffic executes the protocol conversions and transmits messages complying with the protocol used in serial traffic, e.g. RS232, to the device driver controlling the serial port and receives messages coming from the device driver controlling the serial port and converts them into messages intelligible to the MPAPI interface. In a corresponding way, the second adapter block 12b in this example is intended for infrared traffic, wherein this adapter block 12b receives messages coming from the MPAPI interface and transmits them to the protocol stack to be used in infrared traffic. From this protocol stack of infrared traffic (IrDA protocol stack), the processor 11 reads the information to be transmitted preferably byte by byte and transmits this information via the interface block 10 to the second parallel-to-serial converter 8b. The second parallel-to-serial converter 8b transmits the information in serial form to the second transmitter 8c which controls a light-emitting diode 8e, preferably a LED diode transmitting infrared light, according to this information.

In the future, communication can also take place with a so-called Bluetooth protocol stack. The Bluetooth technique is under development particularly for the low power radio frequency transmission (LPRF).

In a corresponding manner, in a receiving situation an electrical signal is formed of the infrared signal with a photosensitive diode 8f. The signal is amplified in the second receiver 8d which also converts the signal into binary data (0/1). This data converted into binary format is transmitted preferably to the second serial-to-parallel converter 8a, in which the serial-format data is formed into bytes of e.g. 8 bits in width. The bytes are transmitted to the interface block 10 from which the processor 11 reads them and transmits to memory means 13, for example an IrDA protocol stack. Furthermore, the processor 11 reports the received data to the operating system. Thus, when operations of the second adapter block are being run by the processor 11, controlled by the operating system, the second adapter block reads the received data from the protocol stack and transmits them further to the MPAPI interface 15 as messages complying with the second connection interface 16. The MPAPI interface 14 transmits the data further to the application as messages complying with the first connection interface 15.

Furthermore, the adapter block 12a–12c has the function of controlling other hardware-dependent functions, such as control the time and to divide messages to be transmitted into parts, and to compile messages received in parts into larger entities according to the protocol definitions.

It is obvious that in practical applications, the implementations of e.g. these connection interfaces and adapter blocks can differ from the above-described preferred embodiments.

Figure 6A:
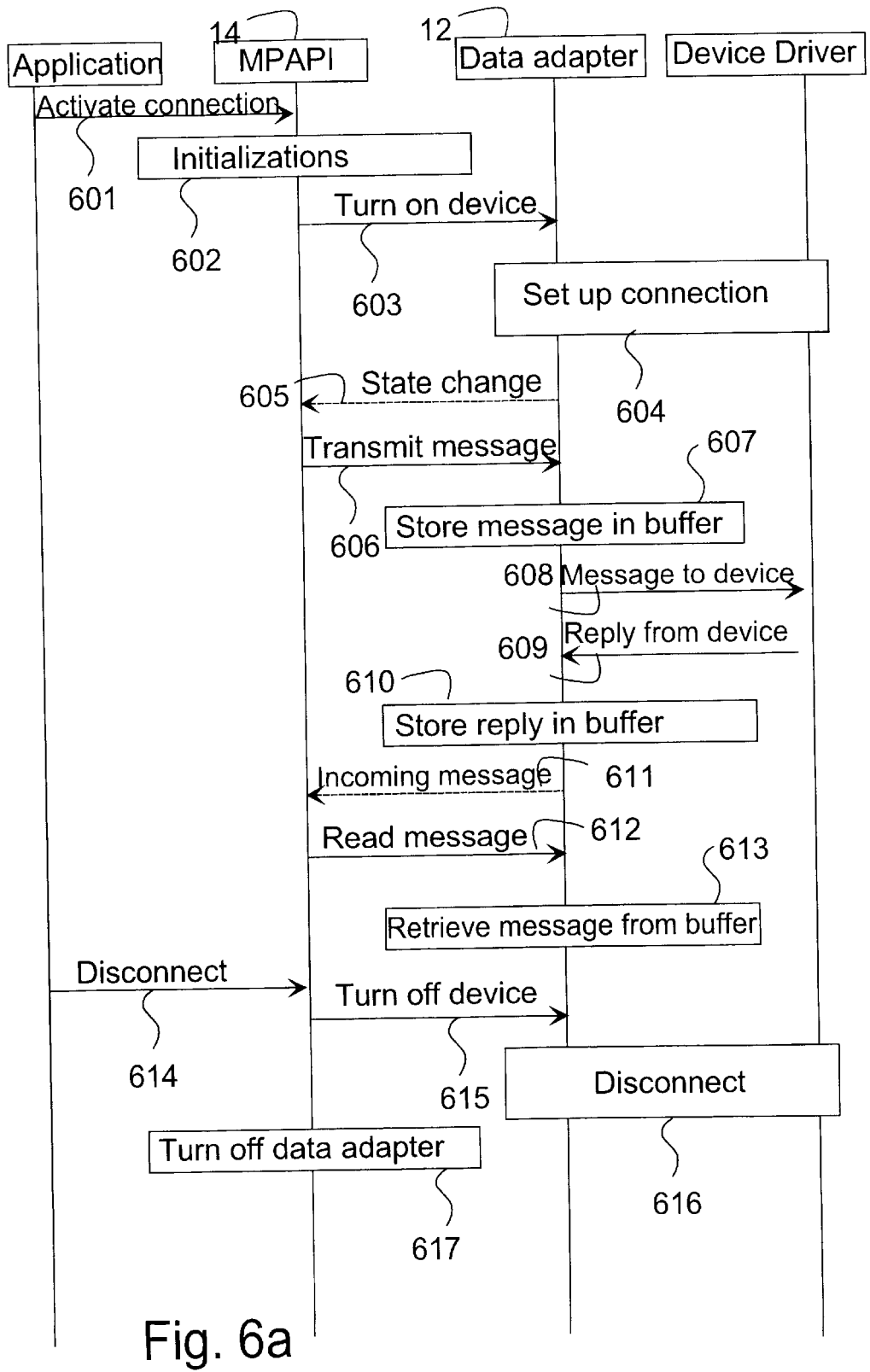
FIG. 6a is a reduced signalling chart illustrating data transmission in a data terminal in a data transmission system according to an advantageous embodiment of the invention.

Moreover, the following is a description on the transmission and reception of messages from an application run in the terminal to the wireless communication device 2, with reference to the arrow chart shown in FIG. 6a. For example, the user wants to set up a call with the wireless communication device 2. Thus, the user selects the function formed for this purpose in the application for example by means of pull-down menus or icons in a way known as such. Thus, the application sets up a call set-up message according to the first protocol used between the application and the MPAPI interface, and transmits it to the MPAPI interface. This message transmission can be implemented for example by signalling according to the operating system, wherein the application first sets up the message in a buffer and informs the type of the message and its location in the memory means 13 to the operating system.

Thus, at a suitable stage, the operating system detects the formed message and examines the destination of the message, after which the operating system reports the incoming message and its location in the memory means 13 to the MPAPI interface. The MPAPI interface reads this message from the memory means 13 and examines its content. This above-described stage is indicated with an arrow 601 in the arrow chart.

After this, the MPAPI interface activates the data adapter (block 602) and transmits an open command to the data adapter 12 (arrow 603). Next, the data adapter 12 sets up a connection to the wireless communication device 2. This is indicated by block 604 in the arrow chart of FIG. 6a. As presented above, the data adapter 12 is preferably informed at this stage of the local data transmission method used by the data terminal 3 and the wireless communication device 2, wherein the data adapter 12 controls the application block 12a, 12b, 12c corresponding to this data transmission method to set up the connection.

After a connection to the wireless communication device 2 has been set up, the data adapter informs the MPAPI interface of this fact e.g. by means of a state change message 605. Next, the MPAPI interface transmits the message that is to be transmitted to the wireless communication device to the data adapter 12 (arrow 606). The data adapter 12 receives the message and transmits it to the adapter block 12a–12c. In the adapter block, the message is converted to comply with the protocol used in the local data transmission connection and is stored in a message buffer (block 607). This message buffer is not indicated in the appended drawings, but its advantageous implementation is a memory space reserved for this purpose in the memory means 13 of the data terminal.

The adapter block 12a–12c transmits this message to the local data transmission connection preferably so that the processor reads the message from the message buffer preferably byte by byte and writes each byte by means of the interface block 10 to the corresponding parallel-to-serial converter, from which the data is transmitted in serial format to the transmitter 7c, 8c, 9c, such as an infrared transmitter 8c, in which this information is converted into an infrared signal (arrow 608).

In the wireless communication device 2, the received signal is converted by data transmission means MX of the wireless communication device into an electrical format, and the received message is processed. The message is for example an AT command, such as "ATD123456", whereby the wireless communication device 2 selects the telephone number 123 456 in the mobile communication network in a way known as such. After setting up a connection to the selected telephone number in the mobile communication network, the wireless communication device 2 reports this to the data terminal 3 (arrow 609) with the data transmission means MX of the wireless communication device. This information is received in the data terminal 3, in which the receiver 7d, 8d, 9d converts it into electrical format to be conveyed preferably to the serial-to-parallel converter 7a, 8a, 9a and further to the interface block 10. Thus, the interface block 10 executes for example an interruption and the processor 11 reads the received information, as already presented above in this description. The processor moves on again to run the adapter block 12a–12c, in which the received message is processed. This message is converted into a message complying with the protocol used between the MPAPI interface and the data adapter, and is stored in the receiving message buffer (block 610). Next, the data adapter 12 forms the message to the MPAPI interface, in which the MPAPI interface is informed of the incoming message (arrow 611). The MPAPI interface transmits preferably a command to read the message to the data adapter (arrow 612), which then transfers the received message to the MPAPI interface (block 613). The MPAPI interface transfers the message further to be used by the application. In this case, the application is informed that the connection to the receiving terminal is established. On the basis of this, the application e.g. changes the symbol to be shown on the display of the data terminal 3, on the basis of which the user of the data terminal 3 finds that the connection is in order.

The user can now for example write a message to be transmitted to the receiving data terminal, or possibly the user wants to transmit a data file to the receiving data terminal (not shown). A data file can be transmitted for example as messages complying with the Internet Protocol (IP). In communication for transmitting messages, data files, etc. between the data terminal 3 and the wireless communication device 2, the above-presented principles are applied, wherein the message to be transmitted is, if necessary, converted to a certain protocol format, divided into shorter messages, and transmitted to the wireless communication device 2. In the wireless communication device 2, these messages are formed into signals suitable to the mobile communication network and transmitted to the receiving data terminal.

At the stage when the user wishes to close the local data transmission connection, this is reported by the application to the MPAPI interface (arrow 614) which further transmits a disconnection command to the data adapter 12 (arrow 615). The adapter block 12a–12c of the data adapter and the respective data transmission means M1, M2, M3 execute the signalling required for disconnecting, depending e.g. on the mode of data transmission involved. This is illustrated by block 616 in FIG. 6a. After disconnecting, the data adapter 12 can also be turned off (block 617), wherein the corresponding memory space is released for other use in the memory means 13 of the data adapter.

This local data transmission connection can also be implemented by running the above-presented setting-up, message transmission and disconnecting operations in connection with each message to be transmitted between the data terminal 3 and the wireless communication device 2, but this is not significant with respect to applying the present invention as such.

Figure 6B:
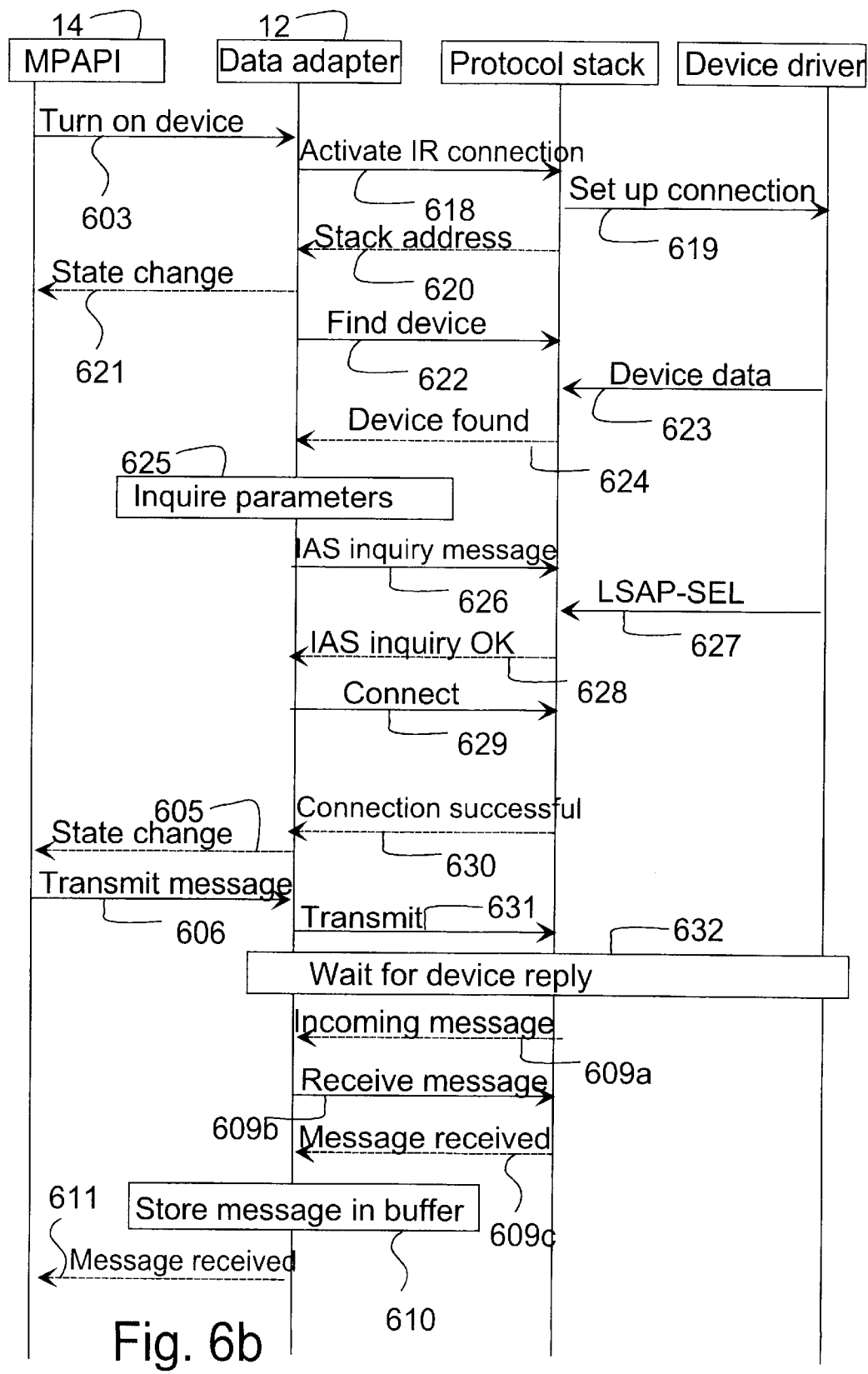
FIG. 6b is a reduced signalling chart illustrating data transmission in a data terminal in a data transmission system according to an advantageous embodiment of the invention by means of infrared data transmission means.

FIG. 6b shows also the signalling used in infrared data transmission in connection with a data adapter 12 according to the invention. For setting up a local data transmission connection, the MPAPI interface transmits a set-up message (arrow 603) to the data adapter 12. The data adapter 12 is informed that the local data transmission connection in this example uses infrared data transmission, wherein the set-up message is transferred in the data adapter 12 to the second adapter block 12b which in this advantageous embodiment is intended for this infrared data transmission to control the infrared data transmission means M2. The second adapter block 12b sets up a request preferably to the operating system to allocate the IrDA protocol stack for infrared data transmission. The infrared data transmission means M2 are controlled via this IrDa protocol stack. For example, at the stage up setting up the connection, interruptions are allowed from these infrared data transmission means M2 to the processor 11 and an interrupt service program formed to process such interruptions is initialized, if necessary. For reducing the power consumption, the operating voltages are preferably turned off in the data transmission means M1, M2, M3 when the data transmission means M1, M2, M3 are not in use. Thus, at the stage of setting up a local data transmission connection, also the operating voltages are switched on for the data transmission means M1, M2, M3 to be used in the data transmission connection to be set up. After the infrared data transmission means M2 have been initialized, the IrDA protocol stack returns information on this, as well as information on the location, tag or the like of the IrDA protocol stack to the second adapter block 12b of the data adapter, on the basis of which this IrDA protocol stack is available during the connection. The data adapter 12 reports this activation of the infrared data transmission means to the MPAPI interface. Furthermore, the adapter block transmits to the protocol stack a message, whereby the infrared data transmission means M2 attempt to detect another device using infrared data transmission, in this advantageous embodiment the wireless communication device 2. After transmission of the locating message 622, the data adapter 12 waits for a reply for a determined time and if it is not received, the data adapter 12 will try to resend the locating message 622.

After the reply transmitted from the wireless communication device 2 is received with the infrared data transmission means M2, the infrared data transmission means M2 report this to the IrDA protocol stack which further transmits the location data to the second adapter block 12b of the data adapter (arrow 625). After this, the second adapter block 12b transmits an inquiry message 626 to find out the properties of the wireless communication device 2. The reply message of the wireless communication device 2 is transmitted to the protocol stack (arrow 627). Next, the protocol stack informs about replying to the inquiry (arrow 628), after which the connection can be set up to the wireless communication device 2.

The connection is set up for example in such a way that the second adapter block 12b transmits a connection set-up message 629 to the protocol stack, which returns status data on the success of the connection set-up 630. When the connection is ready, the data adapter 12 transmits information on the status set-up to the MPAPI interface (arrow 605). After this, the MPAPI interface transmits a message 606 to the second adapter block 12b. The second adapter block 12b converts this message preferably to a message complying with the IrDA protocol and transfers it to the IrDA protocol stack (arrow 631). From the IrDA protocol stack, the message is transmitted via the infrared data transmission means M2 to the wireless communication device 2, in which the message is received and processed. The wireless communication device 2 transmits a reply to the data terminal 3. This reply message is transferred to the IrDA protocol stack. These of transmitting and receiving operations are illustrated by block 632 in FIG. 6b.

The IrDA protocol stack reports on the incoming message to the second adapter block 12b (arrow 609a). After this, the second adapter block 12b transmits a receiving request message 609b for receiving the message. When the whole message is received (arrow 609c), the second adapter block 12b stores the message in a receiving message buffer (block 610) which reports on the received message to the MPAPI interface (arrow 611).

By following the principles presented above, it is also possible to implement the operations required in other types of the data transmission means to initialize the data transmission means, to execute and to end the data transmission. However, it is common to the different data transmission means that the data transmission between the MPAPI interface and the data adapter 12 is independent of the data transmission method to be used at a time. Instead, the signalling between the data adapter 12 and the data transmission means M1, M2, M3 is at least partly dependent on the data transmission method used, wherein the arrow chart of FIG. 6b can differ in this respect with different data transmission means. In any case, it is an advantage of the present invention to known solutions that in the design of the implementation of the data adapter 12 and the data transmission means M1, M2, M3, the designer does not need to have information on the details of the MPAPI interface and the application.

The present invention is not limited solely to the embodiments presented above but it can be modified within the scope of the appended claims.

What is claimed is:

1. A communication system comprising:
   a data terminal;
   a wireless communication device; and
   first data transmission means for setting up a local data transmission connection between the data terminal and the wireless communication device, wherein the first data transmission means includes a data transmission means of the data terminal and a data transmission means of the wireless communication device,
   wherein the data terminal includes:
      means for running application software;
      an application programming interface;
      means for controlling the data transmission means of the data terminal; and
      a first connection interface for data transmission between the application software and the application programming interface,
   wherein the first data transmission means further includes:
      a common data adapter for transmitting data using different transfer protocols for different media types;
      a second connection interface for data transmission between the application programming interface and the data adapter; and
      one or several media interfaces for data transmission between the data adapter and the data transmission means of the data terminal.

2. The communication system according to claim 1, in which information to be transmitted via the first connection interface is arranged to be transmitted according to a first protocol, the information to be transmitted via a second connection interface is arranged to be transmitted according to a second protocol, and the information to be transmitted via said media interface is arranged to be transmitted according to a third protocol, wherein the data adapter comprises for each media interface an adapter block to execute protocol conversions of the information to be transmitted between the second connection interface and the media interface.

3. The communication system according to claim 1, in which the data transmission means of the data terminal comprise at least infrared data transmission means.

4. The communication system according to claim 3, in which the media interface comprises the IrDA protocol stack.

5. The communication system according to claim 1, in which the data transmission means of the data terminal comprise at least radio communication means.

6. The communication system according to claim 5, in which the media interface comprises a Bluetooth protocol stack.

7. The communication system according to claim 1, in which the data terminal comprises at least two data transmission means, wherein the data adapter comprises means for selecting the data transmission means to be used in a local data transmission connection at a time.

8. A data terminal to be used in a communication system, the communication system including a wireless communication device and first data transmission means for setting up a local data transmission connection between the data terminal and the wireless communication device, wherein the first data transmission means includes a data transmission means of the data terminal and a data transmission means of the wireless communication device, the data terminal comprising:
   means for running application software;
   an application programming interface;
   means for controlling the data transmission means of the data terminal;
   a first connection interface for data transmission between the application software and the application programming interface;
   a common data adapter for transmitting data using different transfer protocols for different media types;
   a second connection interface for data transmission between the application programming interface and the data adapter; and
   one or several media interfaces for data transmission between the data adapter and the data transmission means of the data terminal.

9. A method for data transmission between a data terminal and a wireless communication device, in which method:

a local data transmission connection is set up between the data terminal and the wireless communication device;

the data terminal is equipped with an application programming interface and the data transmission means for the data terminal;

an application software is run in the data terminal;

data is transmitted between the application software and the application programming interface via the first connection interface;

a common data adapter is provided for transmitting data using different transfer protocols for different media types, wherein information is transmitted between the application programming interface and the data adapter via a second connection interface; and information is transmitted between the data adapter and the data transmission means of the data terminal via one or several media interfaces.

10. The method according to claim 9, in which information is transmitted via the first connection interface with a first protocol, information is transmitted via said second connection interface with a second protocol, and information is transmitted via said media interface with a third protocol, wherein in the method, a protocol conversion is made on the information to be transmitted between the connection interface and the media interface.

11. The method according to claim 10, in which information is transmitted in infrared signals in the local data transmission connection, and that the third protocol used is the IrDA protocol, wherein an IrDA protocol stack is formed at the media interface.

12. The method according to claim 10, in which information is transmitted in radio frequency signals in the local data transmission connection, and that the third protocol used is the Bluetooth protocol, wherein a Bluetooth protocol stack is formed at the media interface.

13. The method according to claim 10, in which information is transmitted in wired, serial format in the local data transmission connection, and that the third protocol used is the RS232 protocol.

14. The method according to claim 9, in which the data terminal is provided with at least two data transmission means, wherein in the method, the data transmission means are selected for use in the local data transmission connection at a time.

* * * * *